Dec. 14, 1926.  
J. SCHADE  
FILING TRAY  
Filed Oct. 11, 1924  
1,610,710  
6 Sheets-Sheet 1

Inventor  
John Schade  
by  
Attorney

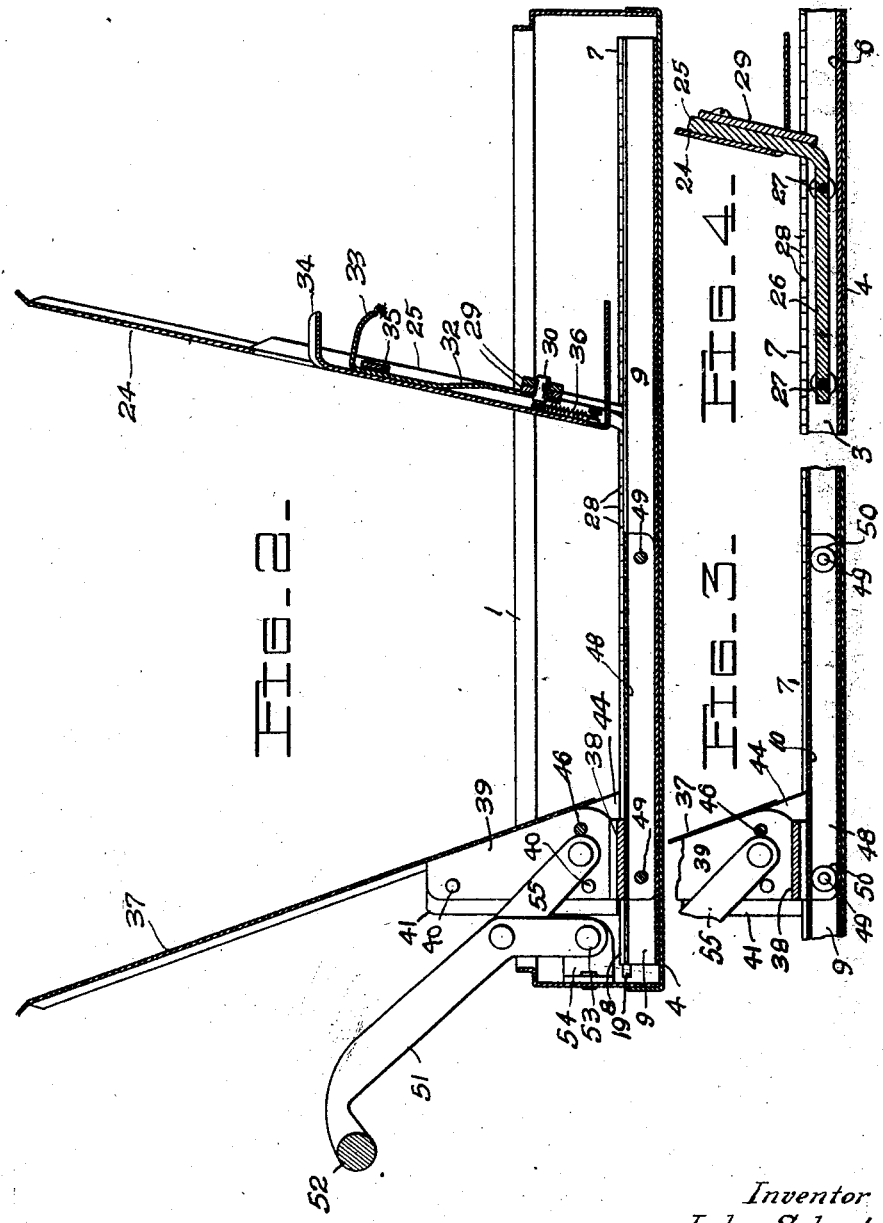

Dec. 14, 1926.
J. SCHADE
1,610,710
FILING TRAY
Filed Oct. 11, 1924
6 Sheets-Sheet 3
FIG_5_
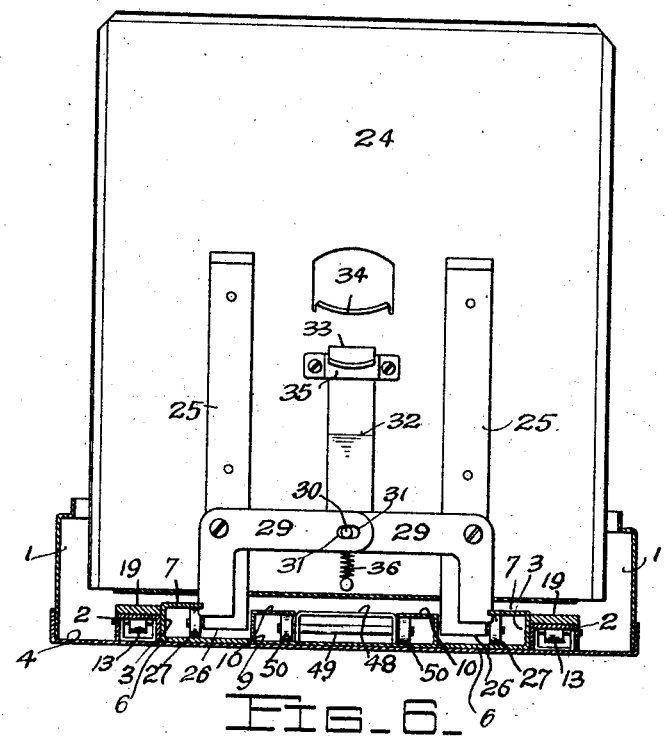
FIG_6_
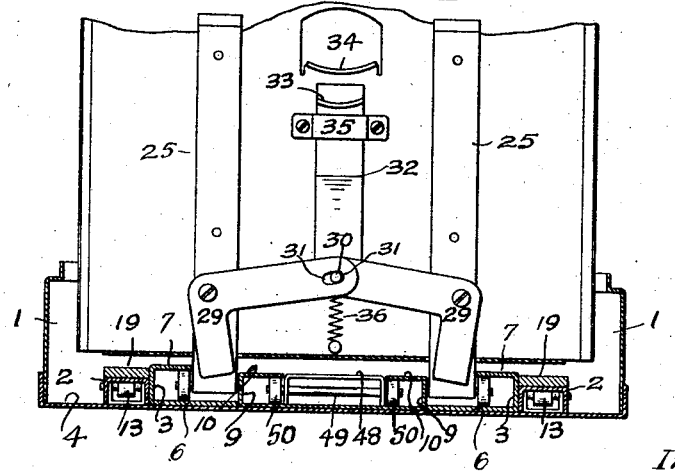
Inventor
John Schade
by
Attorney

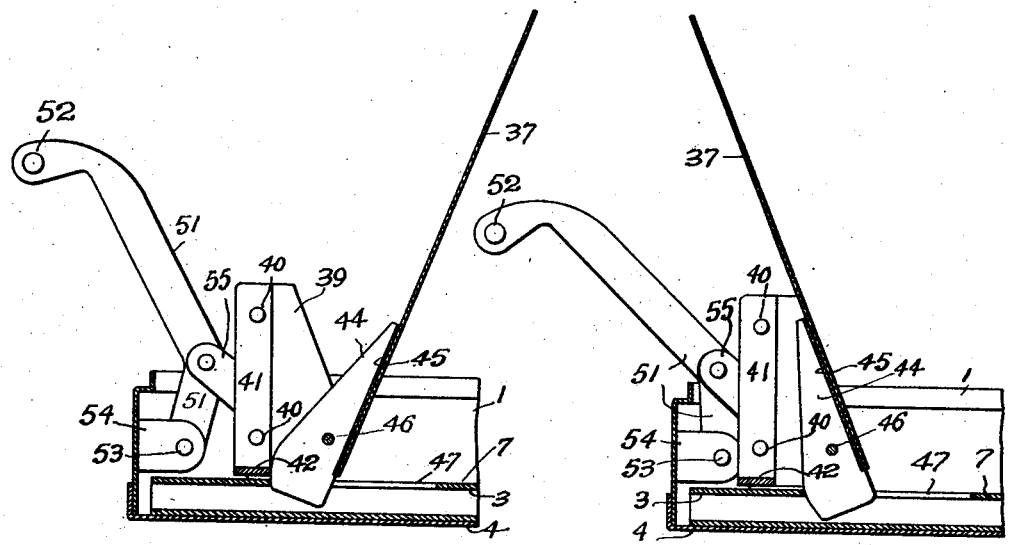
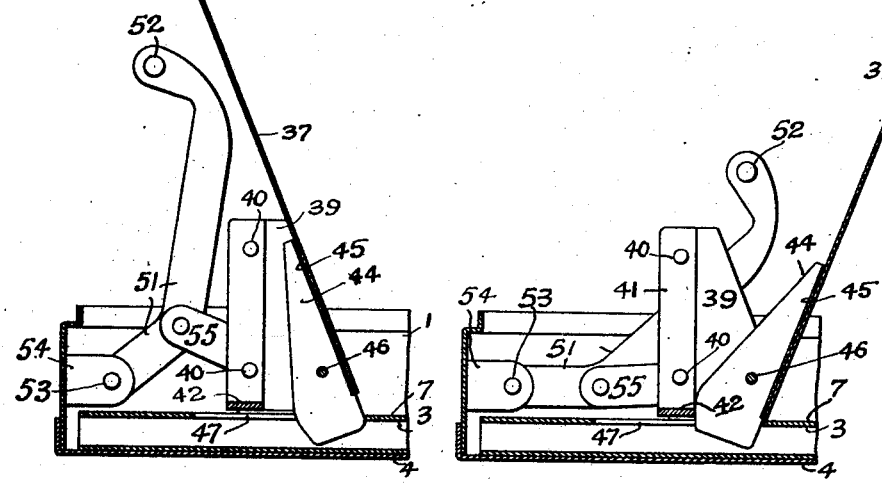

Dec. 14, 1926.  J. SCHADE  1,610,710
FILING TRAY
Filed Oct. 11, 1924   6 Sheets-Sheet 5
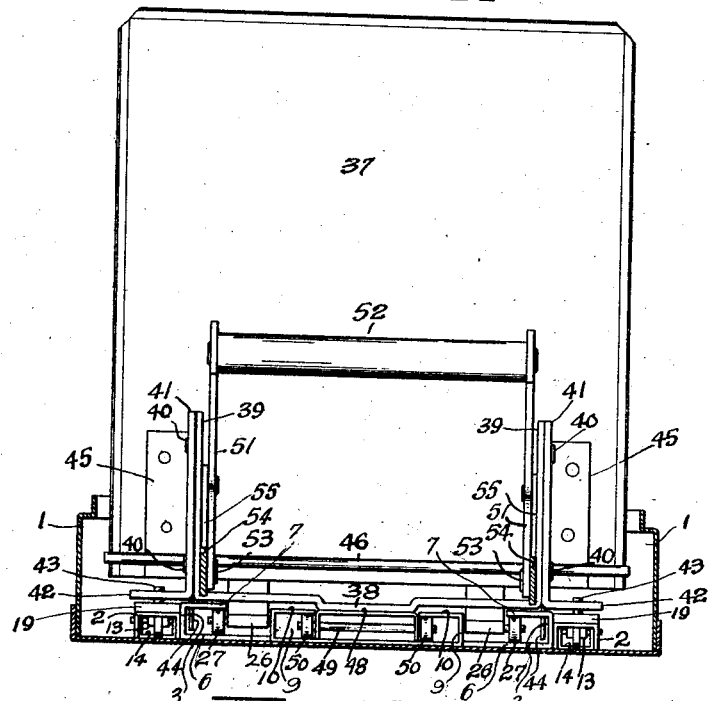
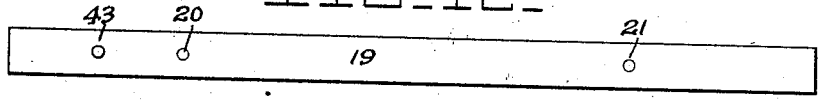
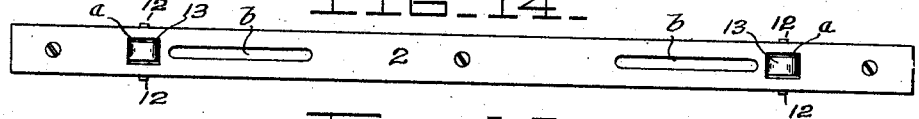
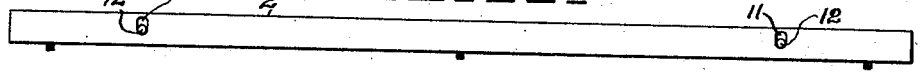
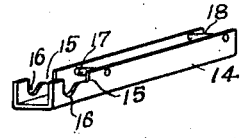
Inventor
John Schade
by
Attorney Dec. 14, 1926.　　　　　　　　　　　　　　　　1,610,710
J. SCHADE
FILING TRAY
Filed Oct. 11, 1924　　　6 Sheets-Sheet 6
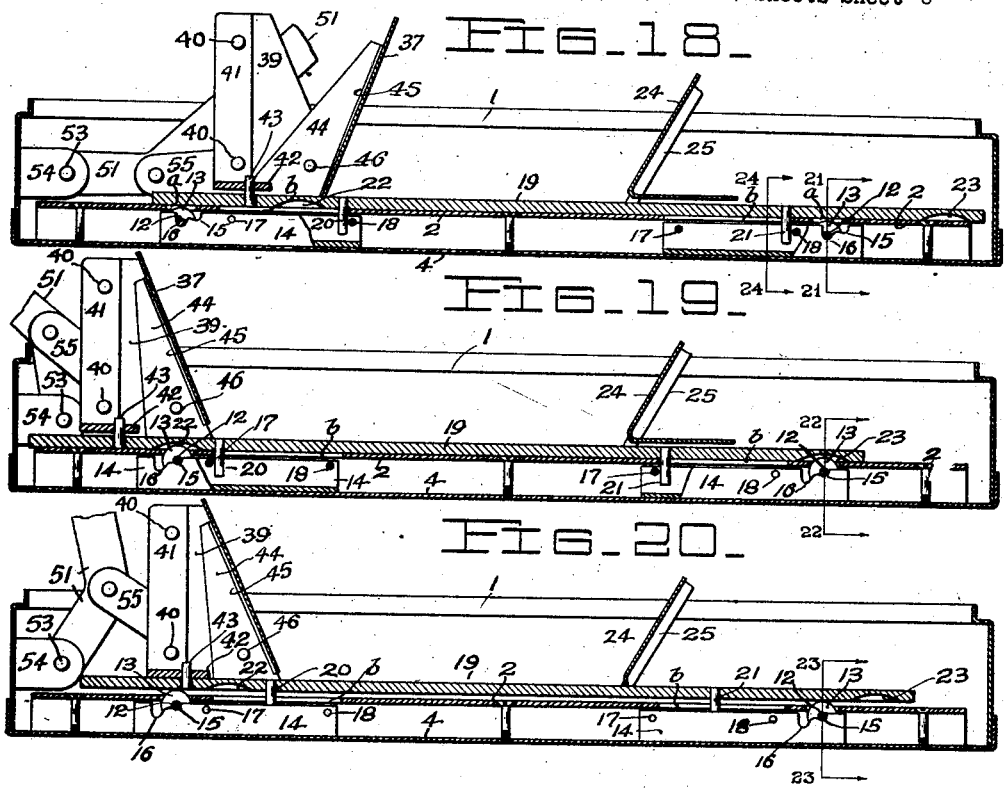
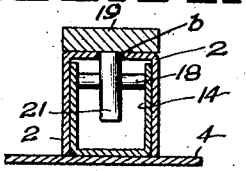
Inventor
John Schade
by
Attorney Patented Dec. 14, 1926.

1,610,710

UNITED STATES PATENT OFFICE.

JOHN SCHADE, OF HOLYOKE, MASSACHUSETTS, ASSIGNOR TO NATIONAL BLANK BOOK COMPANY, OF HOLYOKE, MASSACHUSETTS, A VOLUNTARY TRUST ASSOCIATION OR COPARTNERSHIP, F. B. TOWNE, E. S. TOWNE, J. M. TOWNE, AND F. W. WILSON, TRUSTEES.

FILING TRAY.

Application filed October 11, 1924. Serial No. 742,986.

My invention relates to filing trays for loose leaf sheets, and is particularly identified with the structure shown and described in my pending application, Serial No. 719,285, filed June 11, 1924.

But the present construction relates principally to the embodiment of the principles which characterize the construction shown in said application, and has for its especial object the incorporation of these principles in a commercial filing tray.

In the present construction one of the most important features is the fact that the parts are made ready for use or operated to clamp the sheets by a single movement of an operating lever, and this is very desirable, since, in other trays of this type, it is necessary, first to work an operating lever to separate the sheet holding plates, and afterwards to manually operate the plates to adjust them to the required posting angle.

Another valuable feature of the present invention is that when the lever is operated to withdraw the front compression plate in position for posting, said plate first leaves the mass of sheets at the bottom with the top edge of said plate still leaning against the sheets, and the effect of this is to relieve the suction which would otherwise exist if the compression plate was withdrawn from the sheets in a position parallel thereto, since, in the later instance, several of the top sheets would be withdrawn by suction from the mass of sheets, and these sheets so withdrawn would have to be replaced in position before utilizing the binder.

Also, the particular arrangement of toggle levers in connection with the main operating lever, insures good compression of the front plate against the sheets when in a locked position.

Furthermore, the latch device that is used in connection with the rear plate insures a positive lock on both sides of the plate and also lends itself to very easy manipulation.

The front or compression plate structure is carried by certain parts rigidly secured together so as to move in harmony, and as these parts could be welded, riveted, or otherwise secured so as to be unitary, no special reference to the manner in which these parts are secured will be made.

The rear plate structure is adjustable merely for the purpose of allowing for the variable bulk of the sheets in the binder, and this adjustment is effected by an especially ingenious and efficient means to which attention will be hereinafter directed.

So far as the sheet supporting floors are concerned the same characteristic features are contained in the present construction as those described in my application referred to. Two distinct sets of floors are herein employed, one set being stationary and having frictional surfaces, while the other set is movable and preferably smooth. The distinguishing feature of the present application, however, is that when the smooth surfaced floors are brought into contact with the sheets the front or compression plate structure and the smooth floors themselves are simultaneously moved rearwardly carrying the sheets with them and not sliding the sheets over the smooth floors as is done in the structure described in said pending application, so that in the present invention there is no attrition whatever between these smooth floors and the bottom edges of the sheets, and this is an important feature as the mass of sheets in the binder will frequently weigh ten or fifteen pounds or even more. It will be noted, therefore, that since the sheets are actually carried by the smooth surfaced floors and not slid over them, it is not absolutely necessary that they be smooth. In this instance, both floors could be frictional. I do not, therefore, wish to be confined strictly to the use of frictional and smooth floors, but, in order to distinguish each set of floors from the other, I shall hereafter refer to them as frictionnal and smooth.

As above indicated, the provision of separate floors that are alternately contacted with the sheets at the will of the operator, is fully covered, in what is deemed to be a broad sense, by my pending application referred to, and the description and claims of the present application will be mainly directed toward an approved manner of utilizing said floors.

The accompanying drawings show my invention as embodied in an approved commercial tray file, and referring to these drawings—

Figure 2 is a section at the line 2—2 of Figure 1.

Figure 3 is a section at the line 3—3 of Figure 1.

Figure 4 is a section at the line 4—4 of Figure 1.

Figures 5 and 6 are sections at the line 5—5 of Figure 1, showing the position of the parts when the latching means for the rear plate are engaged and disengaged respectively.

Figures 7 and 8 are broken sections at the line 8—8 of Figure 1, showing the positions of the follower or clamping plate and the parts immediately associated therewith, when said plate has been drawn forward respectively before and after the tilting movement thereof.

Figures 9 and 10 are likewise sections at the line 8—8 of Figure 1, but showing the positions of the follower or clamping plate and the parts immediately associated therewith, when said plate has been thrust rearward respectively before and after the tilting movement thereof.

Figure 11 is a section at the line 11—11 of Figure 1.

Figure 12 is a detail top view of the smooth floor, and

Figure 13 is a longitudinal section thereof.

Figure 14 is a detail top view of the hollow track-plate which supports said smooth floor, and Figure 15 is a side elevation thereof.

Figure 16 is a detail perspective view of the shift bar that is contained within said hollow track plate and whose operation effects the raising and lowering of said smooth floors.

Figure 17 is a detail elevation of one of the rolls journaled within said hollow track plate.

Figures 18 and 19 are broken sections at the line 19 of Figure 1, showing respectively the position of parts when the follower plate is in clamped position and fully opened.

Figure 1:
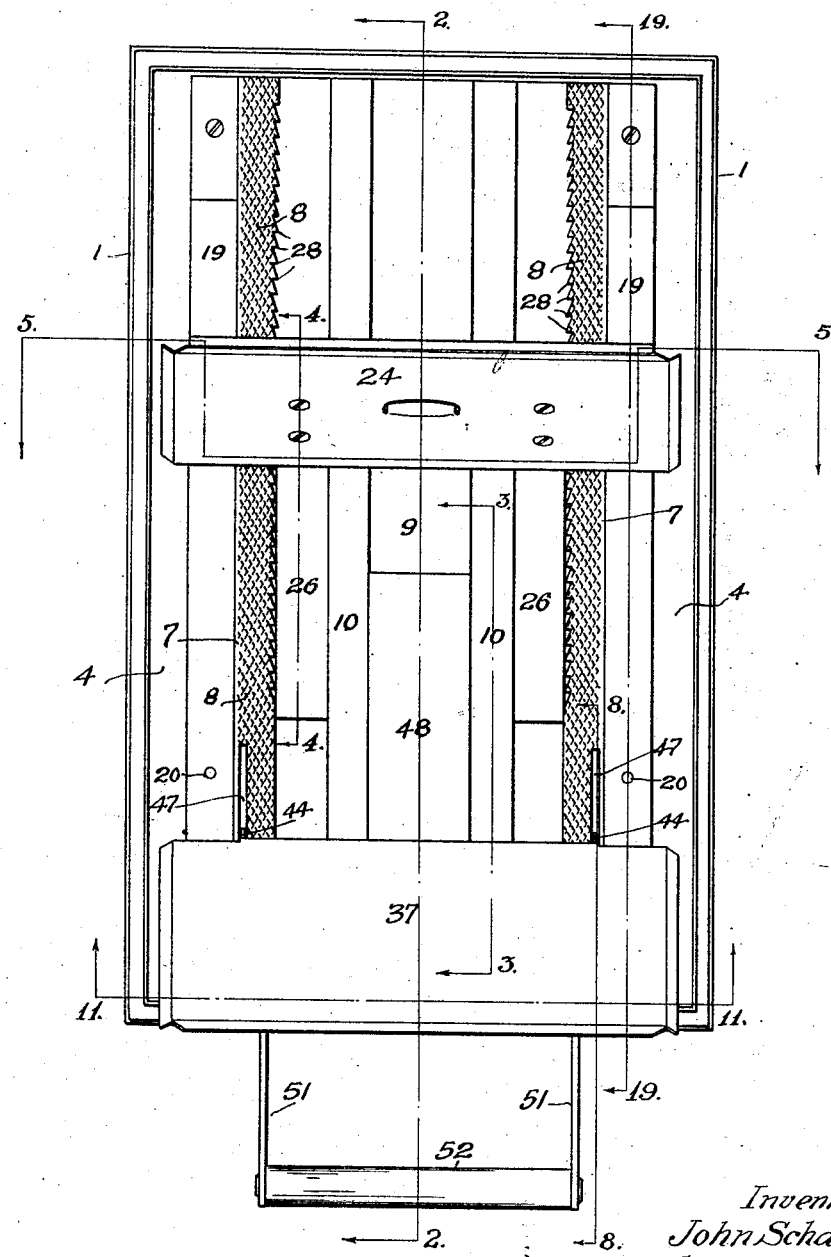
Figure 1 is a plan view of said file.

Figure 20 is a broken section also at the line 19—19 of Figure 1, and showing the position of parts when the follower plate has been initially moved rearward, this view showing particularly the elevation of the smooth floor substantially simultaneously with this movement of said plate, and Figures 21, 22, 23, and 24, are respectively sections at the lines 21—21, 22—22, 23—23, and 24—24, of Figures 18, 19, and 20.

Similar numerals of reference denote like parts in the several figures of the drawing.

The smooth floors and the frictional floors are disposed in pairs at each side of the tray, and each pair is composed of a smooth floor and a frictional floor, and it will be necessary to only materially describe one of these pairs and the parts associated therewith, and therefore these floors and parts will hereinafter be referred to mainly in the singular.

1 is the tray proper constructed in any suitable and approved manner.

2 are hollow elongated track plates made in inverted U-shaped and 3 are elongated angular housings, said plates and housings being preferably side by side and welded or otherwise secured to the bottom 4 of the tray, said housings having upright portions that extend from bottom portions 6 adjacent the inner walls of the plates 2, which upright portions have ledges 7 extending inwardly therefrom, the upper faces of these ledges being roughened to form the frictional floors which are designated for convenient reference by the numeral 8. These plates 2 and housings 3 extend substantially throughout the length of the tray merely for the purpose of allowing for the sliding movements of the front and rear plates.

To the central part of the tray and adjacent the free ends of the bottom portions 6 is welded or otherwise secured a guide member 9 which extends substantially throughout the length of the tray.

This member 9 is open throughout its central portion and has ledges 10 that extend inwardly from each side and are spaced from the bottom of such member. In other words, the member 9 is of a general U-shape with the terminals extended inwardly and separated by a space.

The hollow plates 2 have two sets of vertical slots 11 the slots of each set being opposite each other and forming journals for the short shafts 12 of rolls 13, which latter are therefore contained within the members 2 and are capable of being elevated so as to project through openings $a$ above said members. These pairs of slots and consequently the rolls are spaced apart a distance predetermined by the stroke of the follower or clamping plate, that is to say, the extent throughout which said plate is moved inwardly and outwardly, and this stroke is always the same.

Slidably guided within the hollow track plates 2 are controllers 14 for the rolls 13. These controllers are U-shaped in cross section and have formed in their upper edges near their outer ends high supports 15 and low supports 16 for the shafts 12 of the rolls, these supports being provided by cutting away these edges, so that by sliding the controllers in opposite directions these shafts will drop into the low supports or be elevated into the high supports according to the direction in which the controllers are moved. There are two of these controllers, one near the front and the other near the rear of the tray, and the supports in these controllers are located near the outer ends thereof. Extending from side to side of each controller are spaced cross pins 17, 18, one of the pins 17 being located near the outer end of the front controller while the other pin 17 is located near the inner end of the rear controller, and the pins 18 being respectively located near the inner end of the front controller and near the outer end of the rear controller, the pin 17 in the front controller being near the high support of the latter and the pin 18 in the rear controller being near the low support thereof.

The smooth floors are indicated by the numeral 19 and consist of metal bars that rest on the track plates 2, pins 20 and 21 depending from said floors at predetermined locations through elongated slots b in the track plates 2 into the controllers and between the cross pins 17 and 18, so that it will be clear that when the floors are moved rearward these pins 20 and 21 will strike the pins 17 and 18 and thereby force the controllers rearwardly and cause the shafts of the rolls to drop within the low supports 16 and this will cause the rolls to lower. The reverse of this will follow when the floors 19 are moved toward the front of the tray.

In the underside of these smooth floors are formed recesses 22 and 23 near the front and rear ends respectively, and the depth of these recesses is such that when they are directly over the rolls 13 with the latter in their highest position, and consequently extending above the surface of the plates 2, said rolls will not interfere with the seating of the floors upon said tracks as shown at Figures 19 and 22.

These recesses are at predetermined locations and they are preferably concavities, and, referring to Figure 19, where the positions of parts are shown when the follower or clamping plate is fully moved forward, it will be clear that when the floors 19 are moved rearwardly, the walls of the recesses 22 and 23 will contact the rolls and cause the floors to be bodily elevated. As will be hereinafter described this occurs when the clamping plate is moved rearwardly with loose sheets resting against said plate, the lower edges of said sheets being supported wholly by said floors, the elevation of the latter having raised them above the level of the frictional floors 8 upon which the sheets formerly rested, and in this connection it is pointed out that the normal level of the smooth floors when resting against the plates 2 is below that of the frictional floors. As the smooth floors are moved rearwardly, in harmony with the rearward movement of the follower plate as will be presently explained, the pins 20 and 21 will strike the cross pins 18 and force the controllers rearwardly, thus causing the shafts of the rolls to drop into the low supports 16, whereupon the floors will seat themselves upon the track plates 2, and this is so timed that it will occur simultaneously or thereabouts with the final movement of the follower plate to clamp the sheets against the rear plate.

In opening the file for use the clamping plate is withdrawn toward the front of the tray, and as the smooth floors move in harmony with said plate they will also be moved forwardly, but, referring to Figure 18, it will be clear that these floors will remain seated on the plates 2 during these movements, since the pins 20 and 21 will not contact the other pair of cross pins 17 until near the end of the forward movements of these floors, and when these pins do strike these cross pins, the rolls will be gradually elevated, and by the time that they are in their high supports the recesses 22 and 23 will have been brought immediately over the rolls as shown at Figure 19, and the seating of the smooth floors upon the track plates 2 will be undisturbed.

As these smooth floors and the manner in which they are operated and controlled form one of the main characteristics of my invention, it has been thought best to particularly describe them before entering into a description of the remaining features of the invention, but attention is now directed to the clamping and rear plates, the means for operating and locking the former as well as its relation to the smooth floors, and the means for adjusting and locking the rear plate.

Taking up for first consideration the rear plate which is designated by the numeral 24, and referring particularly to Figures 2, 4, 5, and 6, I would state that the angular disposition of this plate is constant, and that it is secured to metal strips 25 which are bent beneath the bottom of the plate into horizontal guide bars 26 that extend between the sides of the elongated guide member 9 and the elongated angle housings 3, as clearly shown at Figure 1, the outer sides of these bars being adjacent the inner edges of the ledges 7. Journaled to the outer sides of these bars are pairs of spaced rolls 27 which extend beneath the ledges 7 and track upon the bottoms 6 of the members 3, which rolls serve as mere anti-friction devices to facilitate the sliding movements of these bars, and also prevent the vertical displacement of said bars.

Along the inner edges of the ledges 7 are formed ratchet teeth 28 with which pawl members carried by the rear plate engage to lock the latter in any desired adjustment, as will now be explained.

Pivoted to the strips 25 are L-shaped pawl levers 29 the inner ends of which have a loose pivoted connection formed by a pivot pin 30 that extends through elongated slots 31. This pin is carried by the lower end of a latch lever 32 having a finger lift 33 at its upper end, while a stationary thumb piece 34 extends from the back of the plate in proximity to said lift. A strap 35 secured to the back of the plate and loosely straddling the lever 32 serves to guide the latter and a coil spring 36 whose ends are attached to the pin 30 and to the lower edge of the plate 24 serves to restore the pawl levers to normal position.

The lower ends of the levers 29 extend within the housings 3, the outer edges of these levers serving as pawls which engage the teeth 28 and hold the plate 24 in its adjusted position, as shown at Figure 5.

When the part 33 is raised, the latch levers will be operated to withdraw the pawl element from the teeth 28, and when said part is released the spring 36 will restore said levers to normal position with said elements and teeth engaged.

The front or follower plate, designated by the numeral 37 is pivotally supported by a carriage member composed of a base 38 having vertical side wings 39 to which are secured by rivets 40 vertical side plates 41 that terminate at their lower ends in lateral extensions 42 which overhang the front ends of the smooth floors 19, and from these floors pins 43 extend upwardly and loosely through holes in said extensions, so that it will be understood that the sliding movements of said carriage will effect corresponding sliding movements of the floors such as have been heretofore explained.

From the front face of the plate 37 at the bottom and near the sides thereof extend fins 44 that have bases 45 riveted to the plate, and said fins are pivoted around a rod 46 that is carried by the side wings 39, so that it will be clear that this plate will not only move with the carriage but will be capable of independent swinging movements.

These fins project below the bottom edges of the plate and extend into elongated openings 47 in the ledges 7, these openings being of a length predetermined by the movements of the carriage.

The rear plate 24 is adjusted from time to time, as is usual in devices of this description, to allow for the number of sheets resting thereagainst, and the final rearward movements of the plate 37 will always bring the latter into clamping position, and this clamping is effected by moving the carriage toward the rear until the fins 44 strike the inner ends of the slots 47 as shown at Figure 9, whereupon the continued and final movement of the carriage will cause the plate 37 to rock and assume its clamping position, as shown at Figure 10.

This rocking of the plate 37 is very important, since the plate thereby automatically assumes the proper clamping position against the sheets which latter are resting against the inclined rear plate 24, and for the further reason that when it becomes necessary to open the file, the initial withdrawal of the carriage will cause the bottom of the plate 37 to first leave the mass of sheets at the bottom portion thereof with the top of this plate still leaning against the sheets, thus relieving the suction which would otherwise obtain, which is a decided advantage since all outer sheets withdrawn by suction have to be replaced before using the file.

When the plate 37 has been withdrawn to nearly its limit, these fins will strike the front ends of the slots 47 as shown at Figure 7, and the final rearward movement of this plate will effect the tilting of the latter into position for use, as shown at Figure 8.

The movements of the carriage and the parts associated therewith will be clear from the above description, and I will now describe the preferred means which I employ to guide the carriage and to prevent displacement thereof.

Referring particularly to Figures 1, 2, 5, 6, and 11, 48 is an elongated guide member made in the form of an inverted U with the vertical edge portions extending downwardly, this member being located between the ledges 10 of the guide 9. Carried by the rods 49 loosely journaled in the opposite vertical portions of said member and extending beyond said portions are rolls 50 which are located on the rods outside said portions and immediately beneath the ledges 10, so that it will be clear that the member 48 can be moved freely within the guide 9 and will be retained therein by the rolls 50.

The base 38 of the carriage is welded or otherwise secured to the front of the member 48, as shown at Figure 11, and it will therefore be obvious that the carriage and the parts associated therewith will be properly guided and held as against displacement.

A very convenient and efficient means has been provided for actuating the carriage and the parts associated therewith, which consists of a pair of toggle levers 51 connected at their upper ends by a handle bar 52 for unitary operation, the lower ends of these levers extending at an angle to the upper ends and pivoted at their extremities as shown at 53 to ears 54 that are fixed to the inner front wall of the tray. Toggle links 55 are pivoted at their upper and lower ends respectively to the outer faces of the levers 51 and to the inner faces of the side wings 39.

By referring to Figures 2, 7, 8, 9, 10, 11, 18, 19, and 20, it will be clear that the rearward and forward movements of the handle bar 52 will effect the various movements of the carriage and associated parts heretofore described, and furthermore that these movements will be positive and steady, and that the clamping of the follower plate against the mass of sheets resting against the inclined rear plate will be most efficiently brought about by the combined action of these toggle members 51 and 55 and the rocking movement of the clamping plate.

The general operation of my improved tray is as follows:—

Presupposing the parts to be in the positions shown at Figures 1, 2, 8 and 19, where the clamping plate has been fully withdrawn and the device in condition for use, the mass of sheets in the binder will be resting against the rear plate and the lower edges of the sheets will contact the frictional floors. As the operator moves the sheets so that they will rest against the front or clamping plate the frictional floors will prevent the sheets from slipping or sagging, and when the sheets have wholly or partially been transferred so as to be supported by the front plate, the operator grasps the handle bar 52 and pushes it rearwardly, thus immediately causing the smooth floors to be elevated above the level of the frictional floors, as before set forth and as is illustrated at Figure 20, and as the plate moves to clamping position the smooth floors and the sheets will be bodily carried rearwardly, so that there is not the slightest attrition at the lower edges of the sheets, and the clamping will be effected and the floor automatically lowered simultaneously with the clamping, since the pins 20 and 21 will strike the cross pins 17 and 18 and force the controllers rearwardly thereby causing the shafts of the rolls 13 to drop into the low supports, so that the rolls will be below the bottoms of the floors as shown at Figure 18, whereupon the lower edges of the sheets will now be supported by the frictional floors.

When the clamping plate is withdrawn to open the binder, the smooth floors will be carried forward but they will not elevate since the pins 20 and 21 will move idly from the position shown at Figure 18 until they strike the cross pins 17 and 18, which will move the controllers forward so as to force the shafts of the rolls into the high supports and thereby raise the rolls themselves, but, as hereinbefore pointed out, this will not elevate the smooth floors, because the rolls will then be within the recesses 22 and 23, and no elevation of these floors is possible except during the rearward movement of the front plate for the purpose of clamping the sheets.

What is claimed is:—

1. A tray binder for loose sheets, comprising a container tray, a set of floors located at the bottom thereof for supporting the lower edges of said sheets and capable of lengthwise movements, rear and front plates for supporting and clamping the sheets, said front plate being movable toward and away from the rear plate, and connections between the front plate and said floors whereby said plate and floors will be moved in unison.

2. A tray binder comprising a container tray, two sets of floors supported therein, one set being stationary, and the other set being movable and capable of elevation above the level of the stationary floors, and also capable of lengthwise movements, rear and front supporting plates to clamp the sheets, means actuated by the clamping movement of the front plate for elevating the movable floors and maintaining them elevated during such movement of said plate, and connections between said front plate and the movable floors whereby the latter are carried along throughout the clamping and withdrawal movements of said front plate.

3. A tray binder as in claim 2, with the addition that means are provided for automatically lowering one set of the floors at or about the final clamping movements of the front plate.

4. A tray binder as in claim 2, further distinguished in that one set of the aforesaid floors is maintained in its lowered position below the level of the other set of floors during the entire withdrawal of the front plate to its fully opened position.

5. A tray binder as in claim 1, in which the front plate at the limit of its inward movement is rocked to effect the final clamping of the sheets, and is also rocked at the limit of its outward movement to position said plate for posting.

6. A tray binder for posting and clamping loose sheets, comprising a container tray, two sets of floors therein, rear and front support plates to clamp the sheets, means actuated by the movement of the front plate for elevating one of the floors and for maintaining it elevated during the movement of said front plate, connections between the front plate and this last named floor whereby the latter will move lengthwise during the clamping and withdrawal movements of said plate and means for imparting to said front plate an independent rocking at the limits of its inward and outward movements.

7. A tray binder as in claim 6, with the addition that the withdrawal of the front plate from clamping position is primarily effected by rocking said plate to leave the top of the plate resting against the sheets.

8. A tray binder as in claim 6, in which the rear plate is permanently fixed in a rearwardly inclined position, while the front plate at the limit of its inward clamping movement is rocked into an inclined position parallel to that of the rear plate.

9. A tray binder, comprising a container tray, a fixed rear support for loose leaves, a movable front support adapted to be adjusted to posting and clamping positions, two sets of floors, one of said sets being capable of lengthkise movements and also capable of being raised and lowered to planes respectively above and below the surface of the other set, and connections between said front support and said movable floor whereby, when said support is being adjusted to clamping position, said movable floor will travel rearwardly and thereby bodily carry the sheets resting against said support to clamping position.

10. A construction as in claim 9, in which the movable floor will be in its elevated position as it travels rearwardly to convey the sheets to clamping position.

11. A construction as in claim 9, in which the rear support is permanently inclined rearwardly, while the front support is inclined forwardly at the limit of the forward movement of the same and remains in this position until the final clamping of the sheets.

12. A construction as in claim 9, in which one set of floors is rough surfaced and is stationary while the other set of floors is smooth surfaced and is movable, the sheets resting when clamped upon the rough surfaced floors, there being no elevation of the smooth surfaced floors during the withdrawal of the front plate from clamping position to posting position.

13. A construction as in claim 9, in which the movable floor is a smooth surfaced floor and is incapable of elevation or lowering except at the initial rearward movement of the front support and the final clamping movement of said support.

14. In a tray binder, a clamping plate structure comprising a guided carriage to which the clamping plate is pivoted, a set of floors capable of being elevated and lowered by the lengthwise movements of said floors, and loose connections between said carriage and floors, whereby the latter will be elevated and lowered by the sliding movements of the carriage.

15. In a tray binder, a slidable member guided on the floor of said tray, a carriage secured to said member, a clamping plate pivoted to said carriage and having fins depending therefrom at opposite sides, and spaced stops against which said fins strike on the forward and rearward movements of said carriage, whereby said plate is caused to rock.

16. A tray binder having two sets of floors contained therein each set consisting of elongated metal surfaces, the level of one set of floors being normally above that of the other set of floors, the latter comprising hollow inverted U-shaped metal track plates having near each end elongated vertical slots, controllers slidably disposed within opposite ends of said track plates and having spaced cross-pins, interconnected high and low supports formed by cutting away the upper outer end portions of said controllers, rollers having short shafts that extend within these cut away portions and within said slots, floors having recesses formed in their bottom surfaces and resting directly upon said track plates and depending pins that extend between said cross-pins, all disposed and operating in the manner hereinbefore described.

17. In a tray binder, a guide member secured to the central portion of the tray, elongated angle housings secured to the bottom of the tray and having inwardly extending ledges, elongated guide bars confined between said member and housings, a rear sheet supporting plate secured to the outer ends of said bars, and rolls journaled to the sides of the inner ends of said guide bars and extending beneath said ledges whereby said supports are held in position.

18. A construction as in claim 11, in which the ledges have ratchet teeth formed therein, and two L-shaped pawl levers are pivoted at their angular portions to the plate and have their inner ends provided with elongated slots through which a pivot pin projects, a movable latch lever being guided at the back of the plate the lower end of which lever carries said pin, while a spring is connected to said pin and to the lower edge of the plate and functions to normally throw the outer ends of the pawl levers into engagement with said teeth, the elevation of the latch lever releasing said levers.

In testimony whereof I affix my signature hereto.

JOHN SCHADE.